United States Patent
Khalid et al.

(10) Patent No.: US 11,363,512 B2
(45) Date of Patent: Jun. 14, 2022

(54) CONTENT DISTRIBUTION IN A MULTI-NETWORK ENVIRONMENT

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 7 days.

(21) Appl. No.: 16/924,511

(22) Filed: Jul. 9, 2020

(65) Prior Publication Data

US 2022/0014992 A1 Jan. 13, 2022

(51) Int. Cl.
| | |
|---|---|
| *H04W 4/00* | (2018.01) |
| *H04W 36/14* | (2009.01) |
| *H04W 88/06* | (2009.01) |
| *H04W 48/18* | (2009.01) |
| *H04W 76/16* | (2018.01) |
| *H04W 88/10* | (2009.01) |

(52) U.S. Cl.
CPC ........... *H04W 36/14* (2013.01); *H04W 48/18* (2013.01); *H04W 76/16* (2018.02); *H04W 88/06* (2013.01); *H04W 88/10* (2013.01)

(58) Field of Classification Search
CPC ... H04W 36/14; H04W 36/16; H04W 36/165; H04W 36/18; H04W 36/20; H04W 36/22; H04W 36/24; H04W 16/00; H04W 16/04; H04W 16/06; H04W 16/08; H04W 16/10; H04W 24/08; H04W 24/10; H04W 28/00; H04W 28/02; H04W 28/0205; H04W 52/0216; H04W 76/16; H04W 76/11; H04W 48/18; H04W 88/06; H04W 88/10; H04W 88/12; H04W 88/14; H04W 88/18
USPC ......................................................... 370/329
See application file for complete search history.

(56) References Cited

U.S. PATENT DOCUMENTS

| | | | |
|---|---|---|---|
| 2010/0173667 A1* | 7/2010 | Hui ..................... | H04W 72/048 455/552.1 |
| 2019/0124532 A1* | 4/2019 | Almalfouh ............ | H04W 24/08 |

* cited by examiner

*Primary Examiner* — Huy C Ho
(74) *Attorney, Agent, or Firm* — Armis IP Law, LLC

(57) ABSTRACT

A wireless network environment includes communication management hardware, a wireless base station, a core network, and multiple remote networks. The communication management hardware monitors traffic associated with first radio access technology and second radio access technology supported by the wireless base station. The monitored traffic is conveyed through a core network such as from the wireless base station to the remote networks or from the remote networks to the wireless base station. The controller produces control information to convey the traffic through the core network between the wireless base station and multiple remote networks. Based on the control information, the communication management hardware controls conveyance of the monitored traffic through the core network depending on whether the traffic is associated with first radio access technology or second radio access technology.

32 Claims, 12 Drawing Sheets

CONTENT DISTRIBUTION IN A MULTI-NETWORK ENVIRONMENT

BACKGROUND

Mobile service providers usually operate multiple Radio Access Technologies (RATs) in a wireless network environment. Thus, conventional wireless systems typically support multiple types of wireless connectivity at a single wireless base station.

In general, a mobile service operator cannot easily switch to newer radio access technology to replace older radio access technology because customers often still use legacy communication devices that require use of the radio access technology.

Thus, even though radio access technology changes over time, conventional wireless systems sometimes simultaneously support a first radio access technology such as UMTS (Universal Mobile Telecommunications System), a second radio access technology LTE EPC (Long Term Evolution Evolved Packet Core), etc. As previously discussed, a wireless base station may support multiple different radio access technologies.

BRIEF DESCRIPTION OF EMBODIMENTS

There are deficiencies associated with conventional techniques of implementing multiple different types of radio access technologies. For example, unfortunately, legacy radio access technologies usually have lower spectral efficiency and therefore cannot carry as much traffic as newer RATs. This disclosure includes the observation that it is desirable to prioritize traffic and distribute traffic among different RATs more effectively than conventional techniques in order to meet service level agreements (SLAs) and optimize use of different RATs.

Embodiments herein provide improved implementation of wireless access networks and general use of limited wireless bandwidth in a network environment.

As described herein, novel infrastructure is shared among multiple RATs (Radio Access Technology). Certain embodiments herein include a proposed combination NFV (Network Function Virtualization) and SDN (or Defined Networking) based approach to convey and distribute wireless-based traffic.

More specifically, a wireless network environment includes communication management hardware, a wireless base station, a core network, and multiple remote networks. The communication management hardware monitors traffic associated with first radio access technology and second radio access technology supported by the wireless base station. The monitored traffic is conveyed through a core network such as from the wireless base station to the remote networks or from the remote networks to the wireless base station. The controller produces control information to convey the traffic through the core network between the wireless base station and multiple remote networks. Based on the control information, the communication management hardware controls conveyance of the monitored traffic through the core network depending on whether the traffic is associated with first radio access technology or second radio access technology as well as based on available switch resources.

In accordance with further example embodiments, the communication management hardware supports separation of a control plane and data plane to convey data communications (such as data packets). The separation of the control plane and the data plane supports fast monitoring and efficient routing of data packets through the core network between the wireless base station and the multiple remote networks supporting different radio access technology.

In accordance with further embodiments, the multiple remote networks in communication with the wireless base station includes a first remote network and a second remote network with respect to the wireless base station. The first remote network supports communications associated with the first radio access technology; the second remote network supports communications associated with the second radio access technology. In one embodiment, monitoring traffic associated with first radio access technology and second radio access technology includes: receiving first communications from a first base-band unit of the wireless base station supporting the first radio access technology, the first communications being communicated to the first remote network; and receiving second communications from a second base-band unit of the wireless base station supporting the second radio access technology, the second communications being communicated to the second remote network.

In accordance with still further example embodiments, the control information includes first control information and second control information. In one nonlimiting example embodiment, the communication management hardware controls conveyance of the monitored traffic between the wireless base station and the multiple remote networks via: implementing the first control information to control conveyance of the first communications from the first base-band unit and the first remote network; and implementing the second control information to control conveyance of the second communications from the second base-band unit and the second remote network.

The control information includes any suitable facilitating conveyance of the traffic through the core network. As previously discussed, the control information generated by the controller can be generated to include first control information and second control information. The first control information defines a first communication routing path through the core network from the first base-band unit and the first remote network; and the second control information defines a second communication routing path through the core network from the second base-band unit and the second remote network.

In still further example embodiments, the core network includes switch resources. Each of multiple switch resources in the core network is assignable to support conveyance of communications associated with the first radio access technology and the second radio access technology between the wireless base station and multiple remote networks.

The first radio access technology and the second radio access technology can be any suitable interfaces supporting wireless communications in a network environment. By way of non-limiting example, in one embodiment, the first radio access technology is UMTS (Universal Mobile Telecom System) and the second radio access technology is LTE (long Term Evolution).

In yet further example embodiments, the controller receives a first communication to convey through the core network. In furtherance of routing the first communication through the core network, the communication management hardware (controller) retrieves a port number from the first communication. Based on the port number, the communication management hardware determines which of the first radio access technology and the second radio access technology to forward the first communication.

Further embodiments herein include, via the communication management hardware, and during the monitoring, detecting a first communication to convey through the core network; determining a quality of service associated with a mobile communication device to which the first communication pertains; and based on the identified quality of service, selecting a routing path through the core network. In one embodiment, the routing path selected by the communication management hardware provides an appropriate quality of service.

In still further example embodiments, the first wireless base station supports wireless connectivity with a first mobile communication device and a second mobile communication device. The first mobile communication device communicates first communications in accordance with the first radio access technology; the second mobile communication device communicates second communications in accordance with the second radio access technology. In one embodiment, controlling conveyance of the monitored traffic through the core network includes: dynamically adjusting allocation of routing resources in the core network depending on the first communications and the second communications.

Yet further embodiments herein include adjusting allocation of routing resources in the core network depending on wireless bandwidth allocated to support wireless communications between the wireless base station and multiple mobile communication devices.

Embodiments herein are useful over conventional techniques. For example, use of a shared core network to control conveyance of wireless network communications provides greater flexibility over conventional techniques.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: monitor traffic associated with first radio access technology and second radio access technology supported by a wireless base station, the monitored traffic being conveyed through a core network; produce control information to convey the traffic through the core network between the wireless base station and multiple remote networks; and based on the control information, control conveyance of the monitored traffic through the core network, the core network conveying the traffic associated with first radio access technology and second radio access technology.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
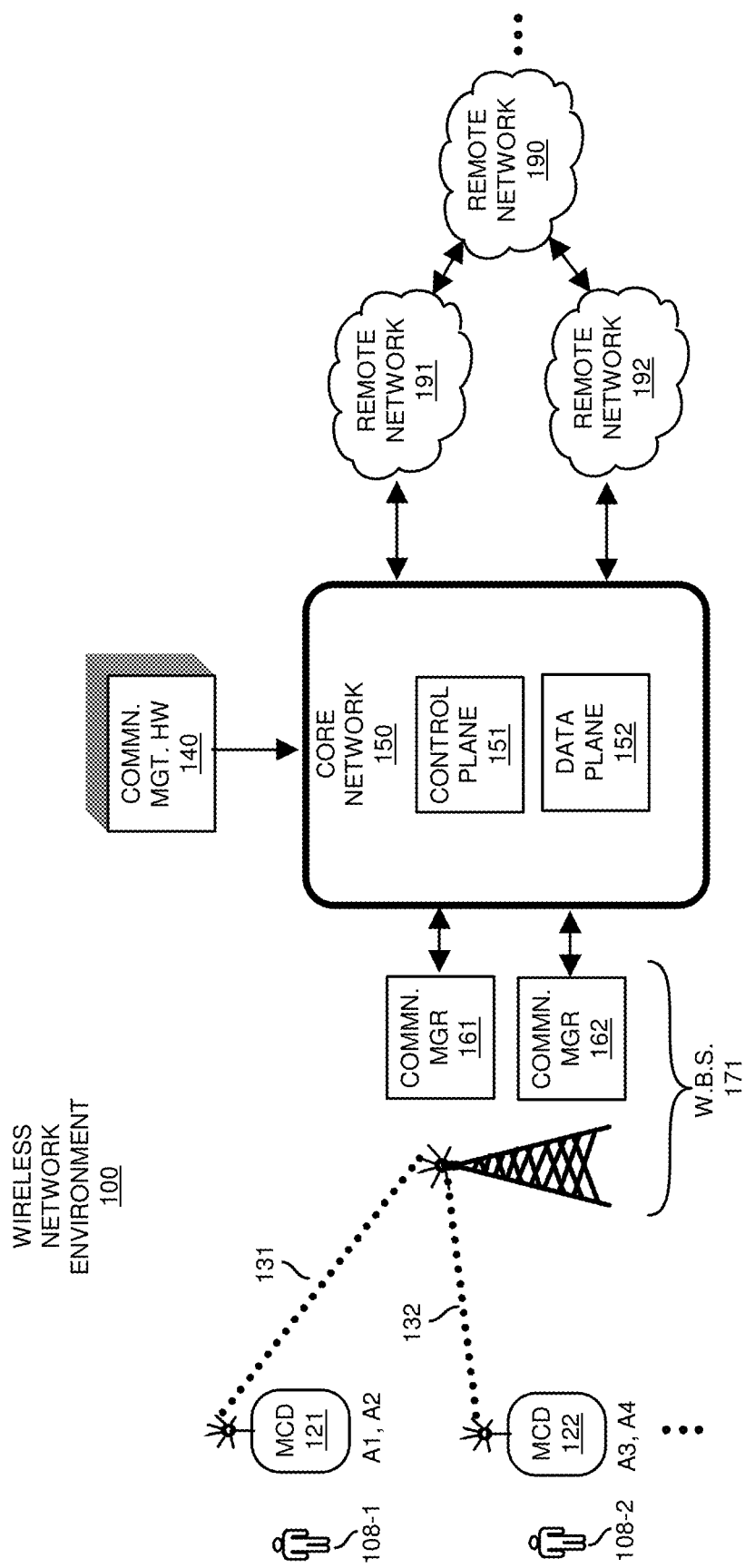
FIG. 1 is an example diagram illustrating a wireless network environment and implementation of a split control plane and data plane according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A wireless network environment includes communication management hardware, a wireless base station, a core network, and multiple remote networks. The communication management hardware monitors traffic associated with first radio access technology and second radio access technology supported by the wireless base station. The monitored traffic is conveyed through a core network such as from the wireless base station to the remote networks or from the remote networks to the wireless base station. The controller produces control information to convey the traffic through the core network between the wireless base station and multiple remote networks. Based on the control information, and control of one or more switches in a core network, the communication management hardware controls conveyance of the monitored traffic through the core network depending on whether the traffic is associated with first radio access technology or second radio access technology.

Now, with reference to the drawings, FIG. 1 is an example diagram illustrating a wireless network environment and implementation of a split control plane and data plane in a core network according to embodiments herein.

In this example embodiment, the network environment 100 includes mobile communication device 121, mobile communication device 122, etc., wireless base station 171, communication management hardware 140, core network 150, remote network 191, remote network 192, and remote network 190.

Mobile communication device 121 executes applications A1 and A2. Mobile communication device 122 executes applications A3 and A4.

Wireless base station 171 includes communication manager 161 (supporting first radio access technology), communication manager 162 (supporting second radio access technology), and corresponding antenna resources to support wireless communication link 131 with mobile communication device 121 and wireless communication link 132 with mobile communication device 122.

As further shown, core network 150 includes a control plane 151 as well as a data plane 152. The control plane 151 controls conveyance of data through the data plane 152.

The wireless base station 171 supports different wireless technology for each of the mobile communication devices 121 and 122 via communication manager 161 (such as an LTE baseband unit) and communication manager 162 (such as a UMTS baseband unit). Accordingly, in one non-limiting example embodiment, the first radio access technology is UMTS (Universal Mobile Telecom System) and the second radio access technology is LTE (long Term Evolution).

Thus, as shown by way of non-limiting example embodiment, the communication manager 161 supports legacy communications such as those based on UMTS (Universal Mobile Telecommunications System); the communication manager 162 supports newer technology communications such as LTE Evolved Packet Core communications. However, note that each of the communication manager 161 and communication manager 162 can support any type of wireless communications.

In accordance with further embodiments, the multiple remote networks 191 and 192 in communication with the wireless base station 171 through the core network 150 (such as an LTE network or other suitable network) includes a first remote network 191 and a second remote network 192 with respect to the wireless base station 171.

As previously discussed, in one embodiment, the first remote network 191 supports communications associated with the first radio access technology; the second remote network 192 supports communications associated with the second radio access technology.

In yet further example embodiments, the communication management hardware 140 monitors traffic associated with the first radio access technology and second radio access technology supported by the wireless base station 171. The monitored traffic from mobile communication devices is conveyed through core network 150 such as from the wireless base station 171 to the remote networks 191 and 192 or from the remote networks 191 and 192 to the wireless base station 171 to the mobile communication devices. A controller associated with the communication management hardware 140 produces control information to control/convey the traffic (communications) through the core network 150 between the wireless base station 171 and multiple remote networks 191 and 192. Based on the control information, the communication management hardware 140 controls conveyance of the monitored traffic through the core network 150 depending on whether the traffic is associated with first radio access technology or the second radio access technology.

In one embodiment, monitoring of the traffic associated with first radio access technology and the second radio access technology includes, via the core network 150 or other suitable entity: receiving first communications from a first base-band unit (such as communication manager 161) of the wireless base station 171 supporting the first radio access technology, the first communications being communicated to the first remote network 191; and receiving second communications from a second base-band unit (such as communication manager 162) of the wireless base station 171 supporting the second radio access technology; the second communications is communicated to the second remote network 192.

As previously discussed, the communication management hardware 140 and core network 150 support separation of a control plane 151 and data plane 152 to convey data associated with mobile communication devices and remote networks 191 and 192. As further discussed herein, the separation of the control plane 151 and the data plane 152 supports fast monitoring and efficient routing of data communications (such as data packets) through the core network 150 between the wireless base station 171 and the multiple remote networks 191 and 192 supporting the different radio access technology.

Figure 2:
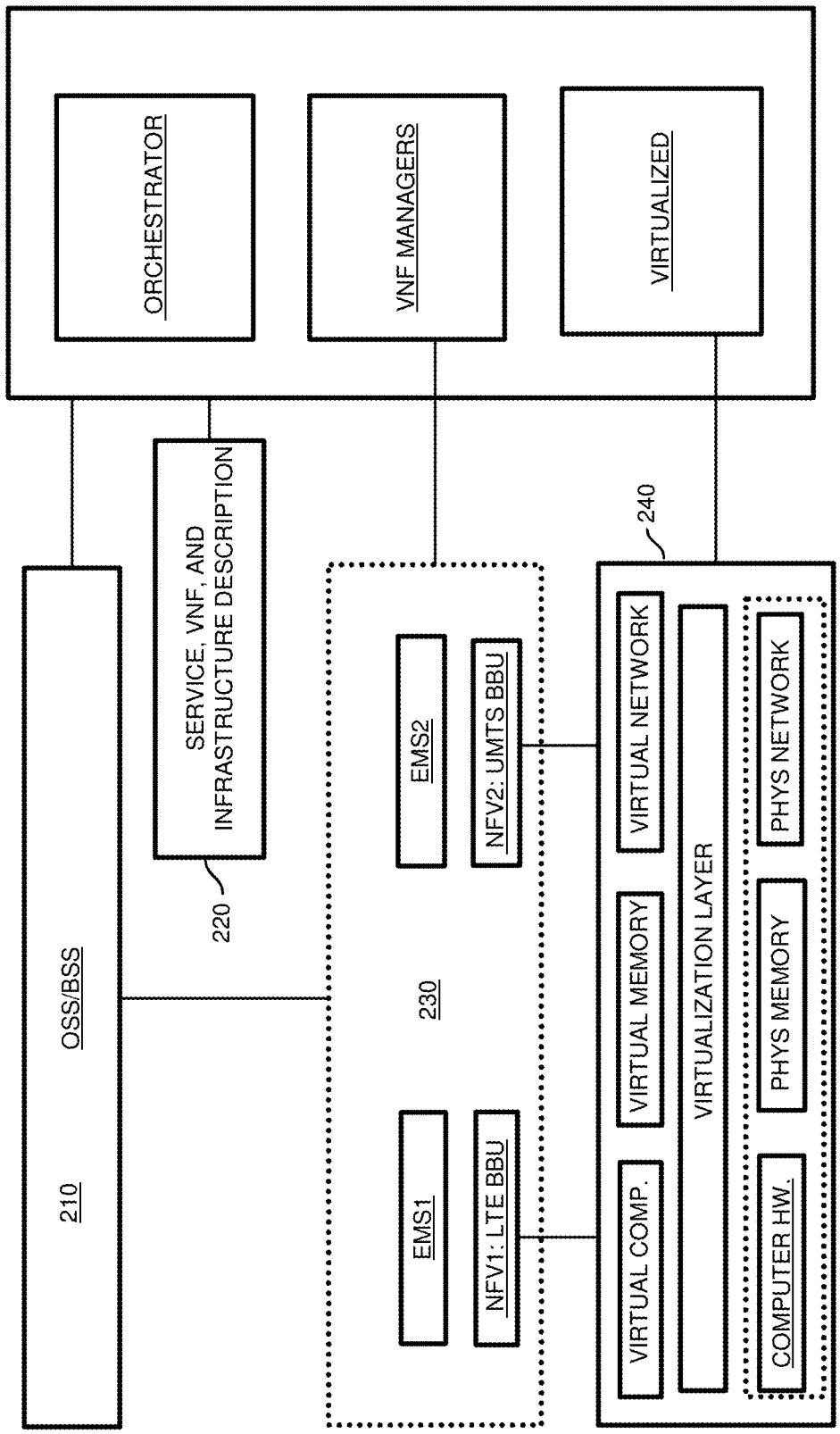
FIG. 2 is an example diagram illustrating infrastructure to implement distribution of data according to embodiments herein.

FIG. 2 is an example diagram illustrating infrastructure to implement distribution of data according to embodiments herein.

As shown, embodiments herein can be implemented via resource 210 (such as Operations Support Systems and Business Support Systems), resource 220 (such as supporting network traffic manager 310, port monitor 320, quality of service 330, and routing manager 340), resource 230 (such as supporting communication manager 161, and communication manager 162), and resource 240 (virtual computer executed on physical hardware).

In one embodiment, the routing manager 340 and one or more other components as discussed herein are implemented via a Software Defined Network. In one embodiment, the routing function provided by the routing manager 340 dynamically defines paths between edge routers in core network 150 based on a desired quality of service. In certain instances, the level of service (quality of service) depends on service agreements (SLAs) between the service provider and the respective users 108-1, 108-2, etc.

Figure 3:
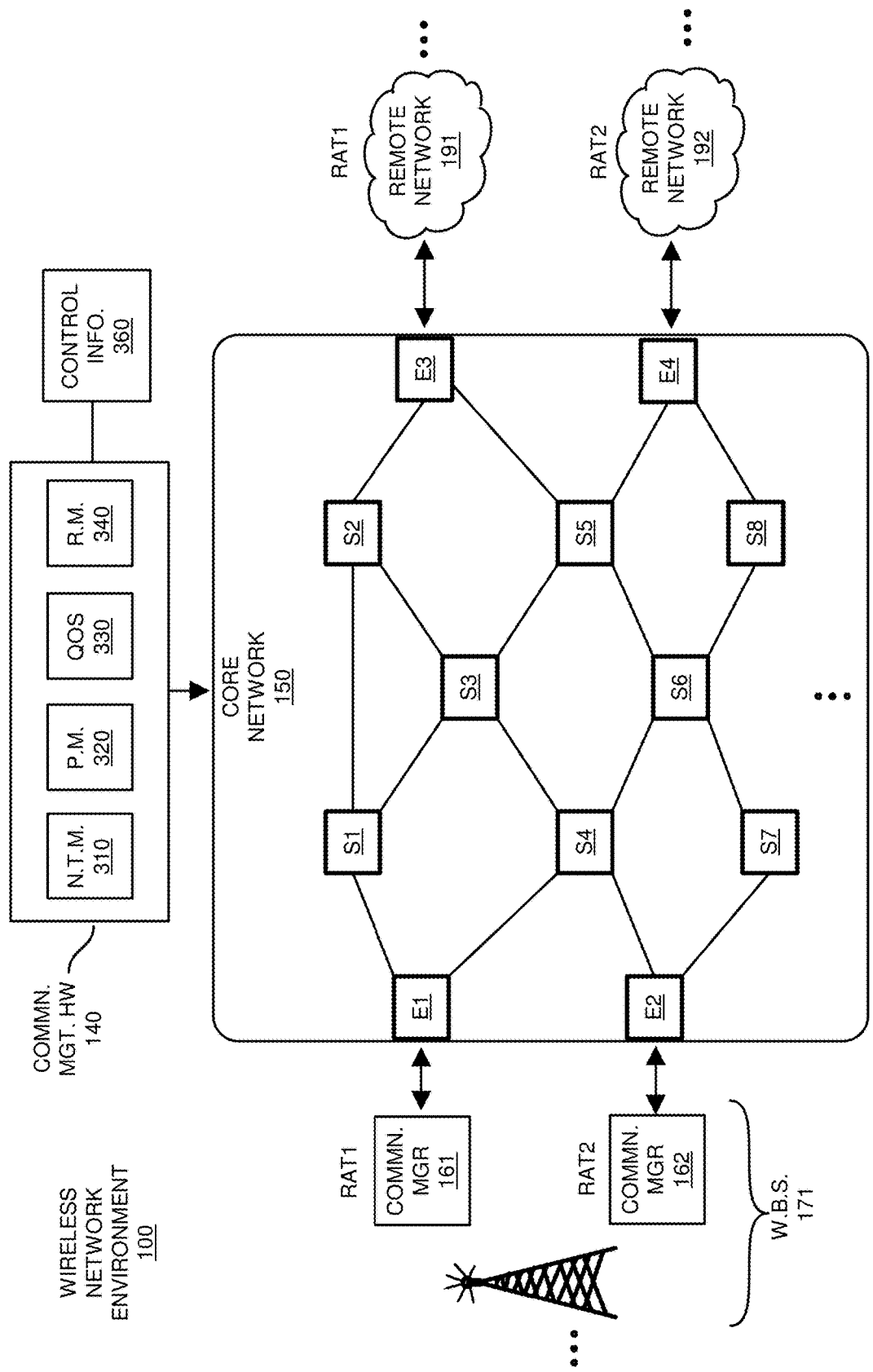
FIG. 3 is an example diagram illustrating control of conveying data packets through a core network to support multiple different radio access technologies according to embodiments herein.

FIG. 3 is an example diagram illustrating control of conveying data packets through a core network to support multiple different radio access technologies according to embodiments herein.

In this example embodiment, the core network 150 includes SDN (Software Defined Network) based switches (such as routers) S1, S2, S3, S4, etc., that define networks/paths using software defined networking approach to create on top of NFV (Network Functions Virtualization). In one embodiment, the software defined networks on top of NFV create the different entities of evolved packet core and packet core of LTE and UMTS respectively.

As further discussed below, the communication management hardware 140 includes network traffic monitor 310, for monitored 320, quality of service through 30, and routing manager 340. The routing manager 340 produces control information 360 to control conveyance of communications through the core network 150.

Figure 4:
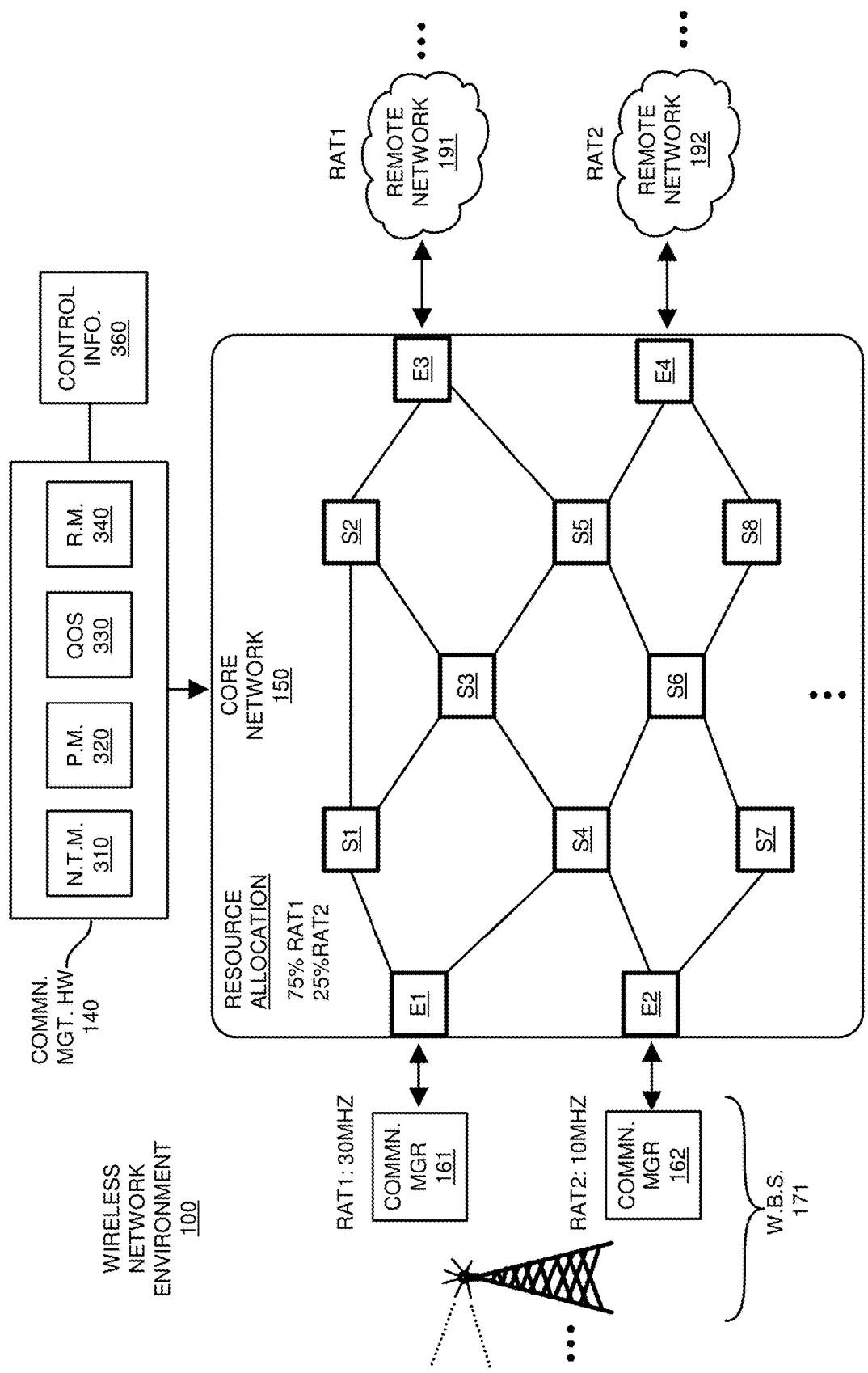
FIG. 4 is an example diagram illustrating a first allocation of resources in a core network supporting multiple different radio access technologies according to embodiments herein.

FIG. 4 is an example diagram illustrating a first allocation of resources in a core network supporting multiple different radio access technologies according to embodiments herein.

In this example embodiment, the wireless base station 171 supports wireless communications (such as via allocated wireless bandwidth of 30 MHz) associated with a first radio access technology. The wireless base station 171 supports wireless communications (such as via allocated wireless bandwidth of 10 MHz) associated with a second radio access technology.

To accommodate the apportionment of wireless bandwidth between the first radio access technology of the second radio access technology, the communication management hardware 140 controls allocation of switches/paths in the core network 150 based on the wireless bandwidth allocation of 30 megahertz to the first radio access technology and 10 megahertz to the second radio access technology. Thus, in this example embodiment, consistent with the apportionment of wireless bandwidth between the first radio access technology of the second radio access technology, the communication management hardware 140 allocates 75 percent of available switch resources and corresponding path resources to the first radio access technology and 25 percent to the second radio access technology.

The use of switches in the core network 150 can be controlled in any suitable manner. For example, in one embodiment, the core network 150 is a packet-switched network; the communication management hardware 140 controls data packet forwarding tables in the respective switches to achieve a desired allocation of resources.

Additionally, or alternatively, the communication management hardware 140 controls data paths between edge nodes to support a desired resource allocation.

Figure 5:
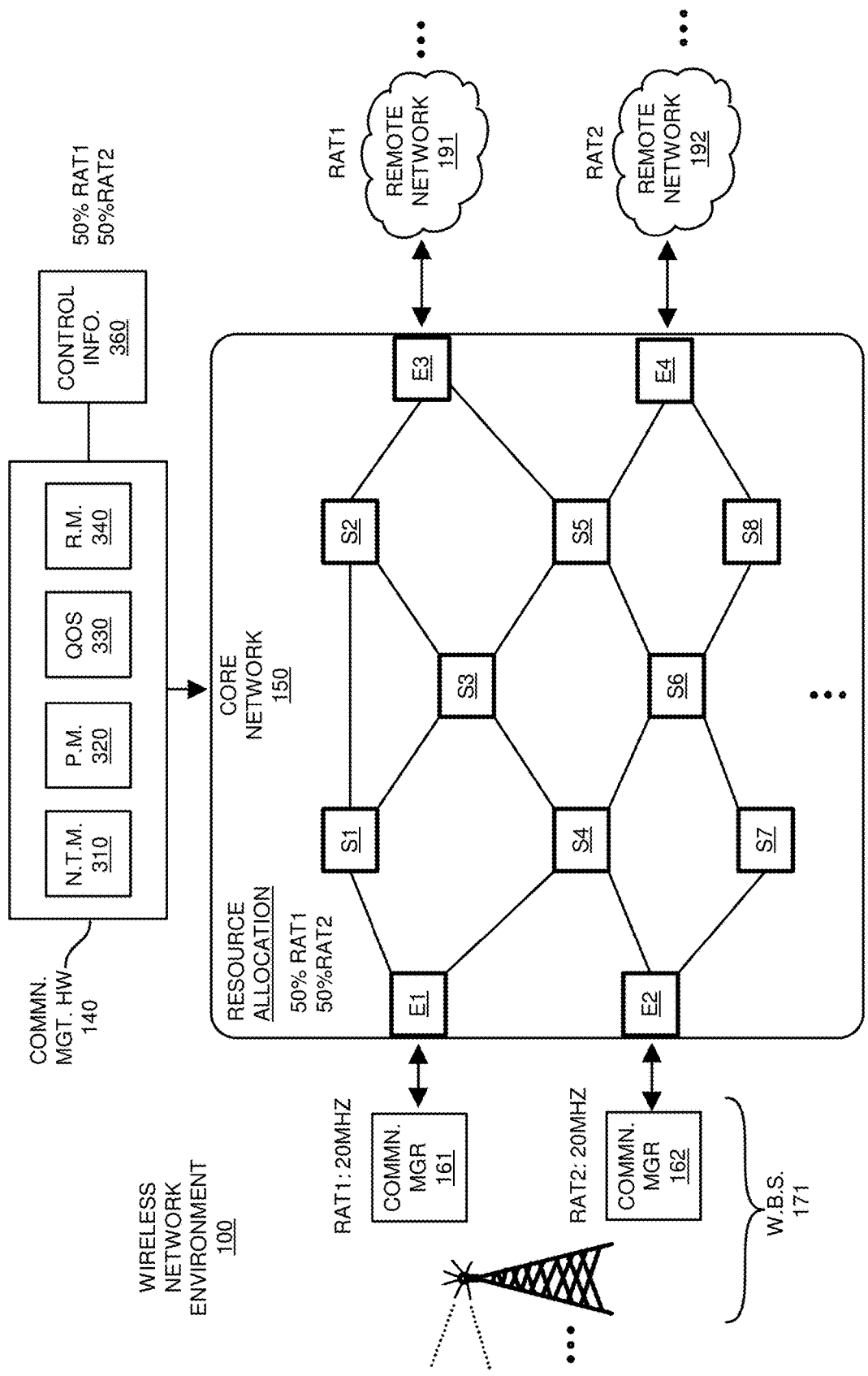
FIG. 5 is an example diagram illustrating a second allocation of resources in a core network supporting multiple different radio access technologies according to embodiments herein.

FIG. 5 is an example diagram illustrating a second allocation of resources and a core network supporting multiple different radio access technologies according to embodiments herein.

Over time, more and more users (such as mobile communication device subscribers) switchover to using newer mobile communication devices that support the second radio access technology, even though a portion of the users continue to use the legacy communication devices supporting the first radio access technology.

In this example embodiment, to accommodate the change in demand towards use of the second radio access technology, the communication management hardware 140 adjusts the allocation of resources in the core network 150 to accommodate the higher demand for the second radio access technology.

More specifically, as shown in FIG. 5, the wireless base station 171 supports wireless communications (such as via allocated wireless bandwidth of 20 MHz) associated with a first radio access technology. The wireless base station 171 supports wireless communications (such as via allocated wireless bandwidth of 20 MHz) associated with a second radio access technology.

To accommodate the change in apportionment of wireless bandwidth between the first radio access technology of the second radio access technology, the communication management hardware 140 controls allocation in the core network 150 based on the wireless bandwidth allocation of 20 megahertz to the first radio access technology and 20 megahertz to the second radio access technology. Thus, in this example embodiment, the communication management hardware 140 allocates 50 percent of available switch resources and corresponding path resources to the first radio access technology and 50 percent of available switch resources to the second radio access technology.

Accordingly, embodiments herein include a first mobile communication device 121 that communicates first communications in accordance with the first radio access technology; the second mobile communication device 122 communicates second communications in accordance with the second radio access technology. In one embodiment, controlling conveyance of the monitored traffic through the core network includes: dynamically adjusting allocation of routing resources (such as switches) in the core network 150 depending on the first communications (first radio access technology communications) and the second communications (second radio access technology communications) conveyed through the core network 150.

Figure 6:
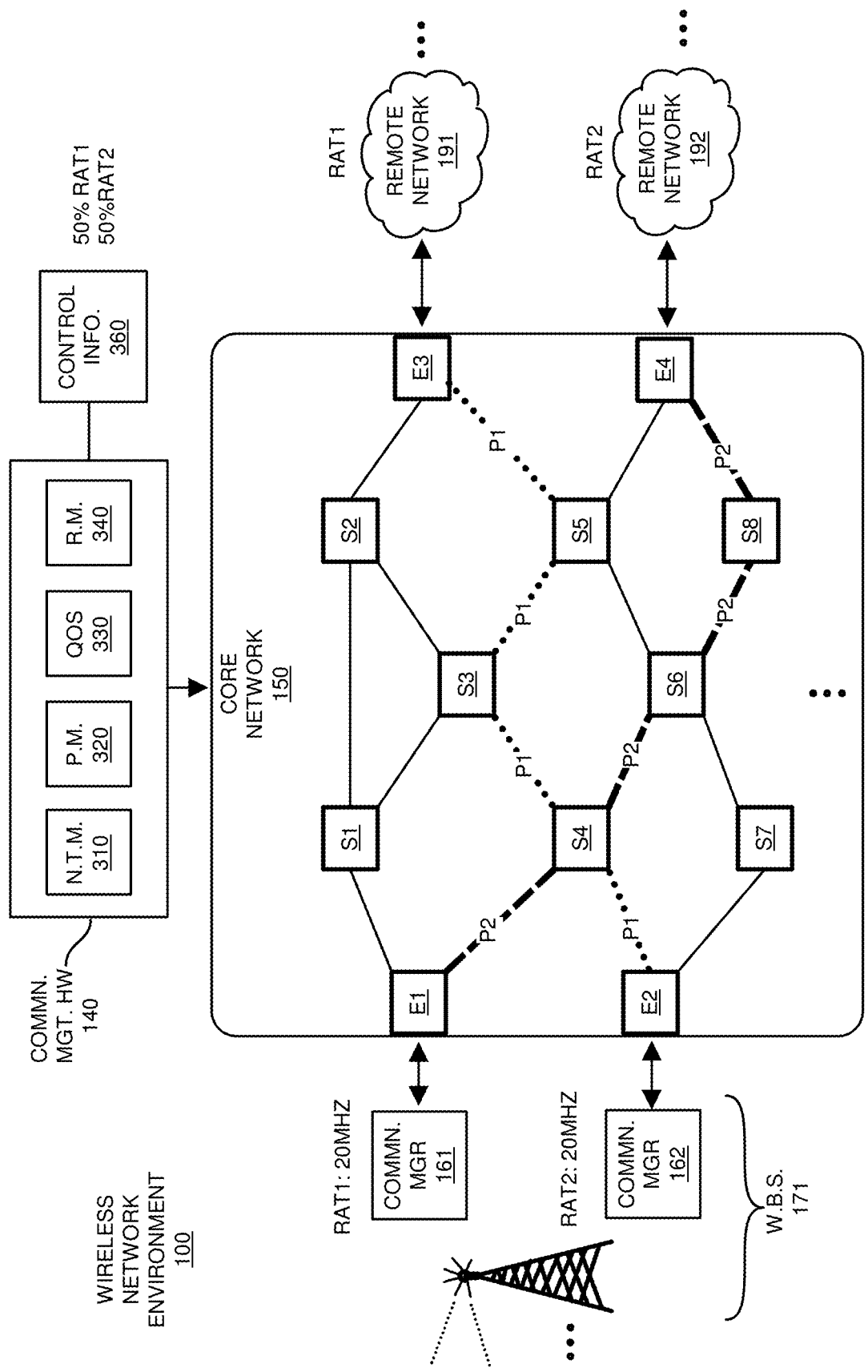
FIG. 6 is an example diagram illustrating implementation of multiple different communication paths in a core network supporting different radio technologies according to embodiments herein.

FIG. 6 is an example diagram illustrating implementation of multiple different communication paths in a core network supporting different radio technologies according to embodiments herein.

As described herein, the core network 150 provides the flexibility of distributing the received communications over different communication paths. For example, as previously discussed, embodiments herein include defining paths in the core network 150 connecting the edge node E1 to the edge node E3; embodiments herein include defining paths in the core network 150 connecting the edge node E2 to the edge node E4.

In one embodiment, each of the multiple switches (router resources) in the core network 150 is assignable to support conveyance of communications associated with the first radio access technology and the second radio access technology between the wireless base station 171 and multiple remote networks 191 and 192. Additionally, or alternatively, first switches in the core network 150 are used to support the first radio access technology while second switches are used to support the second radio access technology.

As further shown in FIG. 6, if desired, the communication management hardware 140 can be configured to produce the control information 360 to provide connectivity of the edge node E1 to the edge node E4 via defined path P2 as well as to provide connectivity between the edge node E2 and the edge node E3 via defined path P1. Thus, the core network 150 supports further options of conveying communications between the communication managers 161 and 162 and the remote networks 191 and 192.

Figure 7:
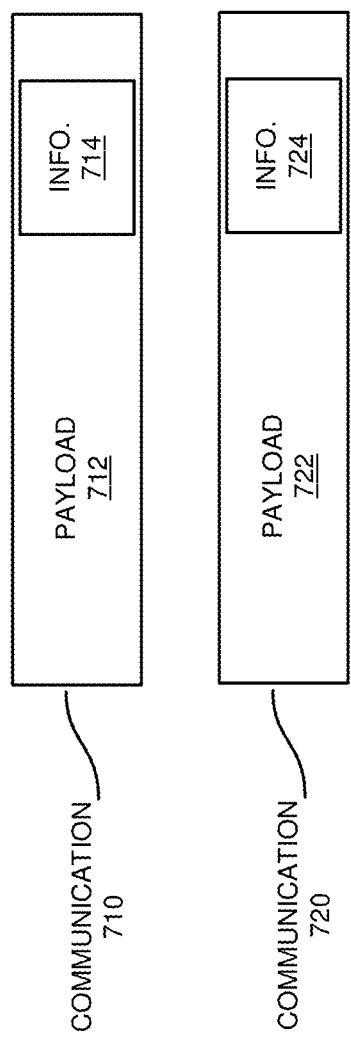
FIG. 7 is an example diagram illustrating multiple communications according to embodiments herein.

FIG. 7 is an example diagram illustrating multiple communications according to embodiments herein.

Assume in this example embodiment that the edge node E3 receives communication 710 for distribution through the core network 150 to a target communication device such as mobile communication device 121.

In this example embodiment, communication 710 includes a payload 712 as well as information 714.

The information 714 includes any data associated with the communication 710. For example, in one embodiment, the information 714 includes information indicating a respective application (such as indicated by a port #) of the mobile communication device 121 to which the communication 710 is targeted. Information 714 can be used for routing/delivery purposes.

Payload 712 can be any suitable information such as image information, video data, etc., associated with a respective application that will use the payload 712 to perform a function such as display information, play back audio, audio data, email data, webpage data, etc.

Assume in this example embodiment that the edge node E3 receives communication 720 for distribution through the core network 150 to a target such as mobile communication device 122.

In this example embodiment, communication 720 includes a payload 722 as well as information 724.

The information 724 includes any data associated with the communication 720. For example, in one embodiment, the information 724 includes information (such as port number information) indicating a respective application of the mobile communication device 122 to which the communication 720 is targeted.

Payload 722 can be any suitable information such as image information, video data, etc., associated with a respective application that will use the payload 722 to perform the function such as display information, play back audio, audio data, email data, webpage data, etc.

Figure 8:
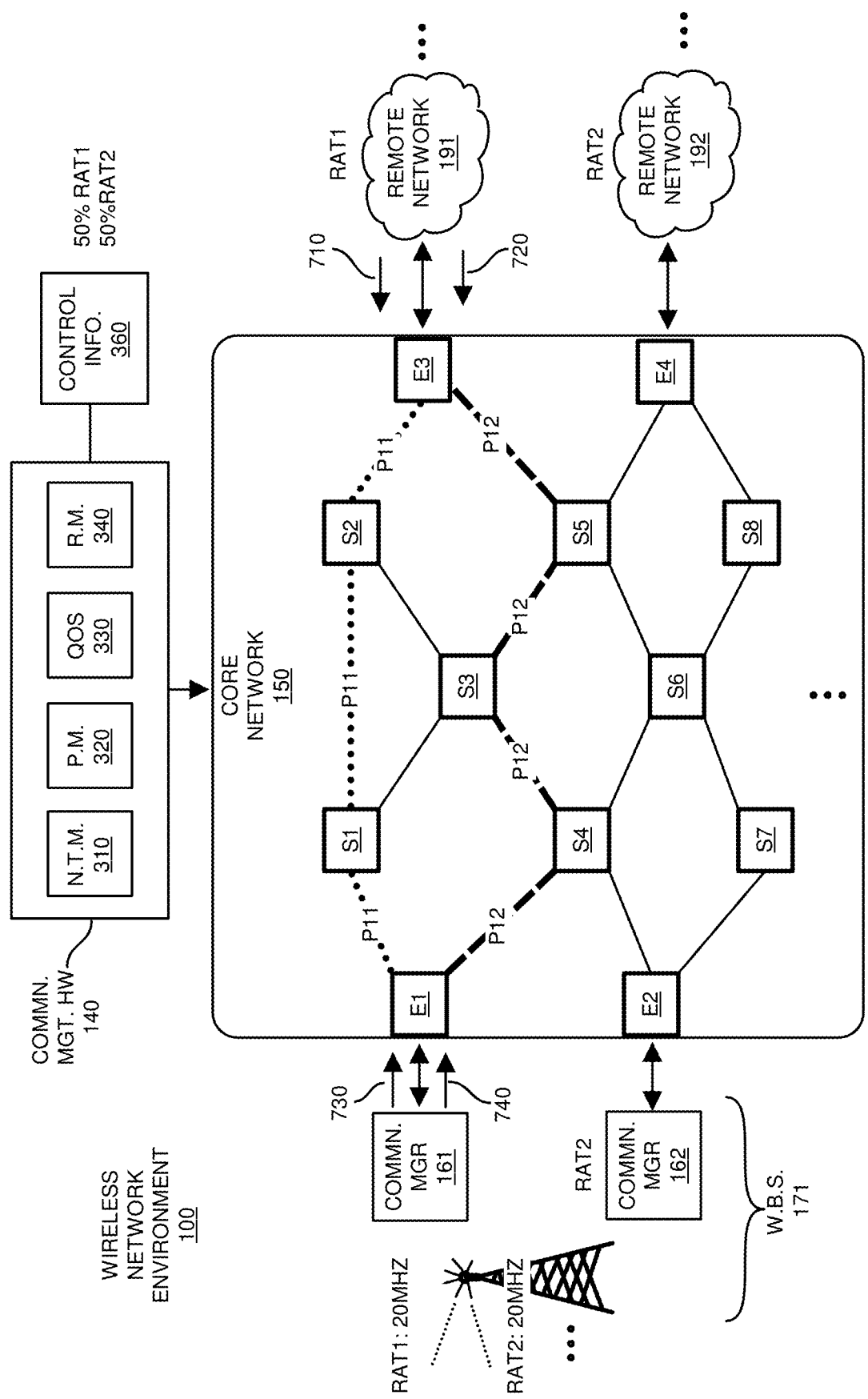
FIG. 8 is an example diagram illustrating routing of communications on different paths through a core network according to embodiments herein.

As further shown in FIG. 8, the communication management hardware 140 and corresponding components control delivery of the respective communication 710 and communication 720.

FIG. 8 is an example diagram illustrating routing of communications on different paths according to embodiments herein.

In this example embodiment, the edge node E3 receives communication 710 and communication 720 for distribution through the core network 150 and wireless base station 171 to corresponding target mobile communication devices.

More specifically, the network traffic monitor 310 detects receipt of the wireless communication 710. In furtherance of delivering the communication 710 through the core network 150 over an appropriate path, the port monitor 320 analyzes the communication 710 and information 714 in the respective communication 710.

Assume in this example embodiment that the port monitor 320 detects from the information 714 (such as a port number) that the communication 710 is directed to a first application executed on the communication device 121.

In accordance with the quality of service 330 to be provided for the communication 710 based on one or more parameters such as attributes of the first application, a service associated with the user 108-1 operating mobile communication device 121, service to be provided for particular type of conveyed data, etc., the routing manager 340 selects the routing path P11 for distribution of the communication 710 through the core network 150 to the wireless base station 171.

In such an instance, the routing manager 340 produces the control information 360 (control plane) defining path P11 (data plane such as such as providing a highest level of quality service, lowest latency, and shortest path).

In one embodiment, the control information 360 defining the path P11 is used by respective switches E1, S1, S2, and E3 to convey the communication 710 over a respective routing path P11 from the edge node E3 to the edge node E1 that delivers the respective communication 710 to the communication manager 161. In other words, in one embodiment, the control information 360 sets up the switches S1 and S2 to provide connectivity through the core network 150 from the edge node E3 to the edge node E1.

As previously discussed, the implementation of the separate control plane 151 and data plane 152 allows for fast monitoring and routing of packets (communications) within different components of the wireless network environment 100. In this example embodiment, the control plane 151 (via control information 360) controls switches E3, S2, S1, and E1 to convey the communication 710 (in a data plane 152) from the remote network 191 through the combination of switches E3, S2, S1, and E1 (path P11) in the core network 150 to the communication manager 161 of the wireless base station 171.

The communication manager 161 associated with the wireless base station 171 receives the communication 710 and further communicates the communication 710 (as a wireless signal) over a respective wireless communication link 131 to the mobile communication device 121.

Upon receipt, the first application in the mobile communication device 121 (to which the communication 710 is directed) receives the communication 710 and utilizes the corresponding payload 712 to perform a desired function such as playback video, play back audio, etc.

As further shown, the network traffic monitor 310 detects receipt of the wireless communication 720 for distribution. In furtherance of delivering the communication 710 through the core network 150 over an appropriate path, the port monitor 320 analyzes the information 724 in the respective communication 720.

Assume in this example embodiment that the port monitor 320 detects from the information 724 that the communication 720 is directed to a second application A2 executed on the communication device 121.

In accordance with a respective quality of service to be provided for the communication 720 based on one or more parameters such as attributes of the second application A2, a service associated with the user 108-1 operating mobile communication device 121, service to be provided for particular type of conveying data, etc., the routing manager 340 produces first control information 360 (control plane) defining the routing path P12 for distribution of the communication 710 through the core network 150 to the wireless base station 171.

In such an instance, the routing manager 340 produces the control information 360 defining path P12 (such as providing a lowest level of quality service, highest latency and longest path through the core network 150). In one embodiment, the control information 360 defining the path P12 is used by respective switches E3, S5, S3, S4, and E2 to convey the communication 720 over a respective routing path P12 from the edge node E3 to the edge node E1 that delivers the respective communication 710 to the communication manager 161.

More specifically, as previously discussed, the implementation of the separate control plane 151 and data plane 152 allows for fast monitoring and routing of packets (communications) within different components of the wireless network environment 100. In this example embodiment, the control plane 151 controls switches E3, S5, S3, S4, and E1 to convey the communication 720 (in a data plane 152) from the remote network 191 through the combination of switches E3, S5, S3, S4, and E1 (path P12) in the core network 150 to the communication manager 161 of the wireless base station 171.

The communication manager 161 associated with the wireless base station 171 further communicates the communication 720 (as a wireless signal) over a respective wireless communication link 131 to the mobile communication device 121.

Upon receipt, the second application A2 in the mobile communication device 121 to which the communication 720 is directed receives the communication 720 and utilizes the corresponding payload 722 to perform a desired function such as playback video, play back audio, etc.

Accordingly, in one embodiment, when a packet such as video traffic (such as associated with a You Tube™ application) is transmitted in a downlink direction from remote network 191 to a target mobile communication device through the wireless base station 171, the port monitor 340 analyzes the received communication prior to conveyance through the core network 150 from the edge node E3 to the edge node E1.

In one embodiment, in accordance with the quality of service 330 to be provided to the received communication and user, the communication management hardware 140 produces control information 360 to control the switches and edge nodes (such as switches) in the core network 150 along a respective route from the node E3 to node E1. As previously discussed, the implementation of the separate control plane 151 and data plane 152 allows for fast monitoring and routing of packets (communications) within different components of the wireless network environment 100.

Note further that a function defined in NFV can be configured to automatically route different types of traffics based on port numbers (such as specified by information 714, 724, etc., in respective data packets). In one embodiment, video or sensitive traffic is routed through LTE while voice message is routed through UMTS.

Further, as previously discussed in corresponding FIG. 6, if desired, the data traffic (i.e., communications) can be conveyed from one radio access technology to another radio access technology based on route information such as a port # to which the communications pertain. One advantage of using such a function in in the NFV is to balance the data traffic through the core network 150.

In accordance with still further example embodiments, the communication management 140 can be configured to control communications in an uplink direction from the wireless base station 171 to the remote network 191 and remote network 192.

For example, in one embodiment, the communication manager 161 supplies the edge node E1 with communication 730 for delivery through core network 150. In a similar manner as previously discussed, the routing manager 340 produces control information 360 providing an appropriate uplink path from the edge node E1 to the edge node E3 for delivery of the communication 730 to the remote network 191. In one embodiment, based upon a respective destination to which the communication is being transmitted or other suitable one or more parameters, the routing manager 340 produces the control information 360 to setup a communication path (such as including switch S1 and switch S2) between the edge node E1 and edge node E3 for delivery of the respective communication 730 to remote network 191. Remote network 191 forwards the received communication 740 further upstream through the remote network 190 to a target communication device.

The communication manager 161 supplies the edge node E1 with communication 740 for delivery through the core network 150. In a similar manner as previously discussed, the routing manager 340 produces control information 360 providing an appropriate uplink path from the edge node E1 to the edge node E3 for delivery of the communication 730 to the remote network 191. In one embodiment, based upon a respective destination to which the communication is being transmitted or other suitable one or more parameters, the routing manager 340 produces the control information 360 to setup a communication path (such as including switches S4, S6, and S5) between the edge node E2 and edge node E4 for delivery of the respective communication 740 to remote network 192. Remote network 192 forwards the received communication 740 further upstream through the remote network 190 to a target communication device.

Figure 9:
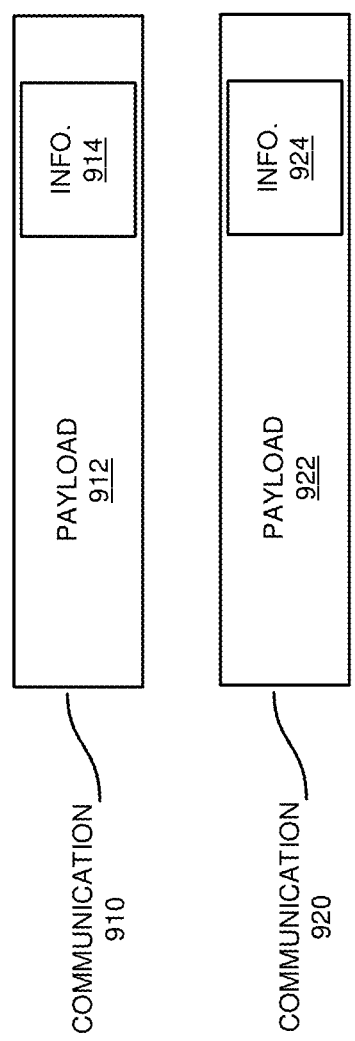
FIG. 9 is an example diagram illustrating multiple communications according to embodiments herein.

FIG. 9 is an example diagram illustrating multiple communications according to embodiments herein.

Assume in this example embodiment that the edge node E3 receives communication 910 for distribution through the core network 150 to a target such as mobile communication device 121.

Communication 910 includes a payload 912 as well as information 914. The information 914 includes any data associated with the communication 910. For example, in one embodiment, the information 914 includes information indicating a respective application (such as port number) of the mobile communication device 121 to which the communication 910 is targeted.

Payload 912 can be any suitable information such as image information, video data, audio data, email data, webpage data, etc., associated with a respective application that will use the payload 912 to perform the function such as display information, play back audio, etc.

Assume further in this example embodiment that the edge node E4 receives communication 920 for distribution through the core network 150 to a target such as mobile communication device 122.

In this example embodiment, communication 920 includes a payload 922 as well as information 924. The information 924 includes any data associated with the communication 920. For example, in one embodiment, the information 924 includes data indicating a respective application of the mobile communication device 122 to which the communication 920 is targeted.

Payload 922 can be any suitable information such as image information, video data, audio data, email data, webpage data, etc., associated with a respective application that will use the payload 922 to perform the function such as display information, play back audio, etc.

Figure 10:
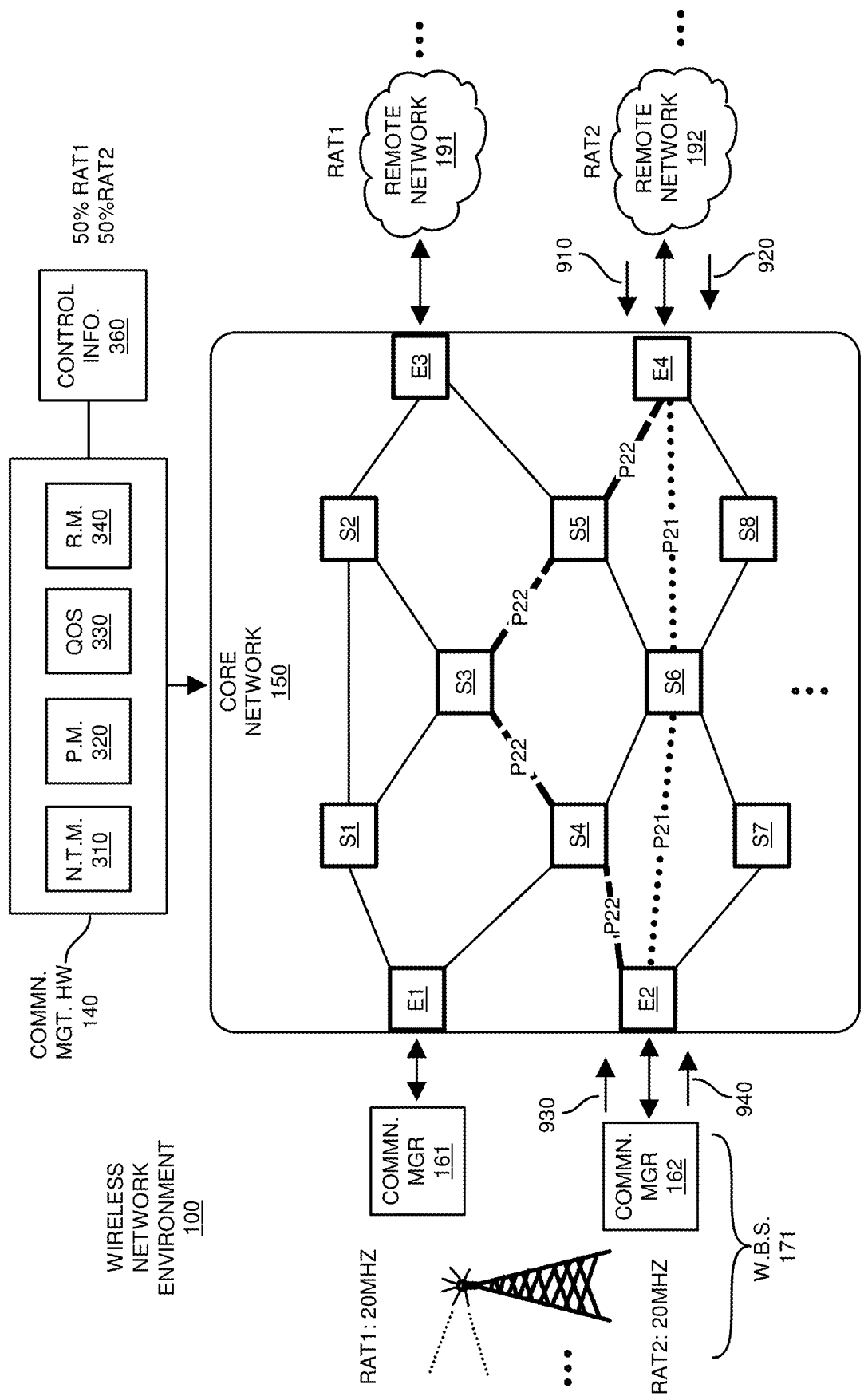
FIG. 10 is an example diagram illustrating routing of communications on different paths through a core network according to embodiments herein.

As further shown in FIG. 10, the communication management hardware 140 and corresponding components control delivery of the respective communication 910 and communication 920.

FIG. 10 is an example diagram illustrating routing of communications on different paths through a core network according to embodiments herein.

In this example embodiment, the edge node E3 receives communication 910 and communication 920 for distribution through the core network 150 and wireless base station 171 to corresponding target mobile communication devices.

More specifically, the network traffic monitor 310 detects receipt of the wireless communication 910. In furtherance of delivering the communication 910 through the core network 150 over an appropriate path, the port monitor 320 analyzes the information 914 in or associated with the respective communication 910.

Assume in this example embodiment that the port monitor 320 detects from the information 914 that the communication 910 is directed to a first application (such as application A3) executed on the communication device 122.

In accordance with the quality of service to be provided for the communication 910 based on one or more parameters such as attributes of the first application, a service associated with the user 108-2 operating mobile communication device 122, service to be provided for particular type of conveying data, etc., the routing manager 340 selects the routing path P21 for distribution of the communication 910 through the core network 150 to the wireless base station 171.

In such an instance, the routing manager 340 produces the control information 360 defining path P12 (such as providing a highest level of quality service, lowest latency and shortest path). In one embodiment, the control information 360 defining the path P12 is used by respective switches E4, S6, and E2 to convey the communication 910 over a respective routing path P21 from the edge node E4 to the edge node E2 that delivers the respective communication 910 to the communication manager 162.

More specifically, as previously discussed, the implementation of the separate control plane 151 and data plane 152 allows for fast monitoring and routing of packets (communications) within different components of the wireless network environment 100. In this example embodiment, the control plane 151 controls switches E4, S6, and E2 to convey the communication 910 (in a data plane 152) from the remote network 192 through the combination of switches E4, S6, and E2 (path P21) in the core network 150 to the communication manager 162 of the wireless base station 171.

The communication manager 162 associated with the wireless base station 171 further communicates the communication 910 (as a wireless signal) over a respective wireless communication link 131 to the mobile communication device 121.

Upon receipt, the application A3 in the mobile communication device 122 to which the communication 910 is directed receives the communication 910 and utilizes the corresponding payload 912 to perform a desired function such as playback video, play back audio, etc.

As further shown, the network traffic monitor 310 detects receipt of the wireless communication 920. In furtherance of delivering the communication 920 through the core network 150 over an appropriate path, the port monitor 320 analyzes the information 924 in or associated with the respective communication 920.

Assume in this example embodiment that the port monitor 320 detects from the information 924 that the communication 920 is directed to a second application A4 executed on the communication device 121.

In accordance with a respective quality of service to be provided for the communication 920 based on one or more parameters such as attributes of the second application, a service associated with the user 108-2 operating mobile communication device 122, service to be provided for particular type of conveying data, etc., the routing manager 340 produces second control information defining the routing path P22 supporting distribution of the communication 920 through the core network 150 to the wireless base station 171.

In such an instance, the routing manager 340 produces the control information 360 defining path P22 (such as providing a lowest level of quality service, highest latency and longest path). In one embodiment, the control information 360 defining the path P22 is used by respective switches E4, S5, S3, S4, and E2 to convey the communication 920 over a respective routing path P22 from the edge node E4 to the edge node E2 that delivers the respective communication 910 to the communication manager 162.

As previously discussed, the implementation of the separate control plane 151 and data plane 152 allows for fast monitoring and routing of packets (communications) within different components of the wireless network environment 100. In this example embodiment, the control plane 151 controls switches E4, S5, S3, S4, and E2 to convey the communication 920 (in a data plane 152) from the remote network 191 through the combination of switches E4, S5, S3, S4, and E2 (path P22) in the core network 150 to the communication manager 162 of the wireless base station 171.

The communication manager 162 associated with the wireless base station 171 further communicates the communication 920 (as a wireless signal) over a respective wireless communication link 132 to the mobile communication device 122.

Upon receipt, the second application (such as application A4) in the mobile communication device 122 to which the communication 920 is directed receives the communication 920 and utilizes the corresponding payload 922 to perform a desired function such as playback video, play back audio, etc.

In accordance with still further example embodiments, as previously discussed, the communication management hardware 140 can be configured to control communications in an uplink direction from the wireless base station 171 to the remote network 192.

For example, the communication manager 162 supplies the edge node E2 with communication 930 for delivery through core network 150. In a similar manner as previously discussed, the routing manager 340 produces control information 360 providing an appropriate uplink path from the edge node E2 to the edge node E4 for delivery of the communication 930 to the remote network 192. In one embodiment, based upon a respective destination to which the communication is being transmitted or other suitable one or more parameters, the routing manager 340 produces the control information 360 to setup a communication path (such as including switch S6) between the edge node E2 and edge node E4 for delivery of the respective communication 930 to remote network 192. Remote network 192 forwards the received communication 930 further upstream through the remote network 190 to a target communication device in remote network 190.

The communication manager 162 supplies the edge node E2 with communication 940 for delivery through the core network 150. In a similar manner as previously discussed, the routing manager 340 produces control information 360 providing an appropriate uplink path from the edge node E2 to the edge node E4 for delivery of the communication 940 to the remote network 192. In one embodiment, based upon a respective destination to which the communication is being transmitted or other suitable one or more parameters, the routing manager 340 produces the control information 360 to setup a communication path (such as including switches S7, S6, and S8) between the edge node E2 and edge node E4 for delivery of the respective communication 940 to remote network 192. Remote network 192 forwards the received communication 940 further upstream through the remote network 190 to a target communication device.

Figure 11:
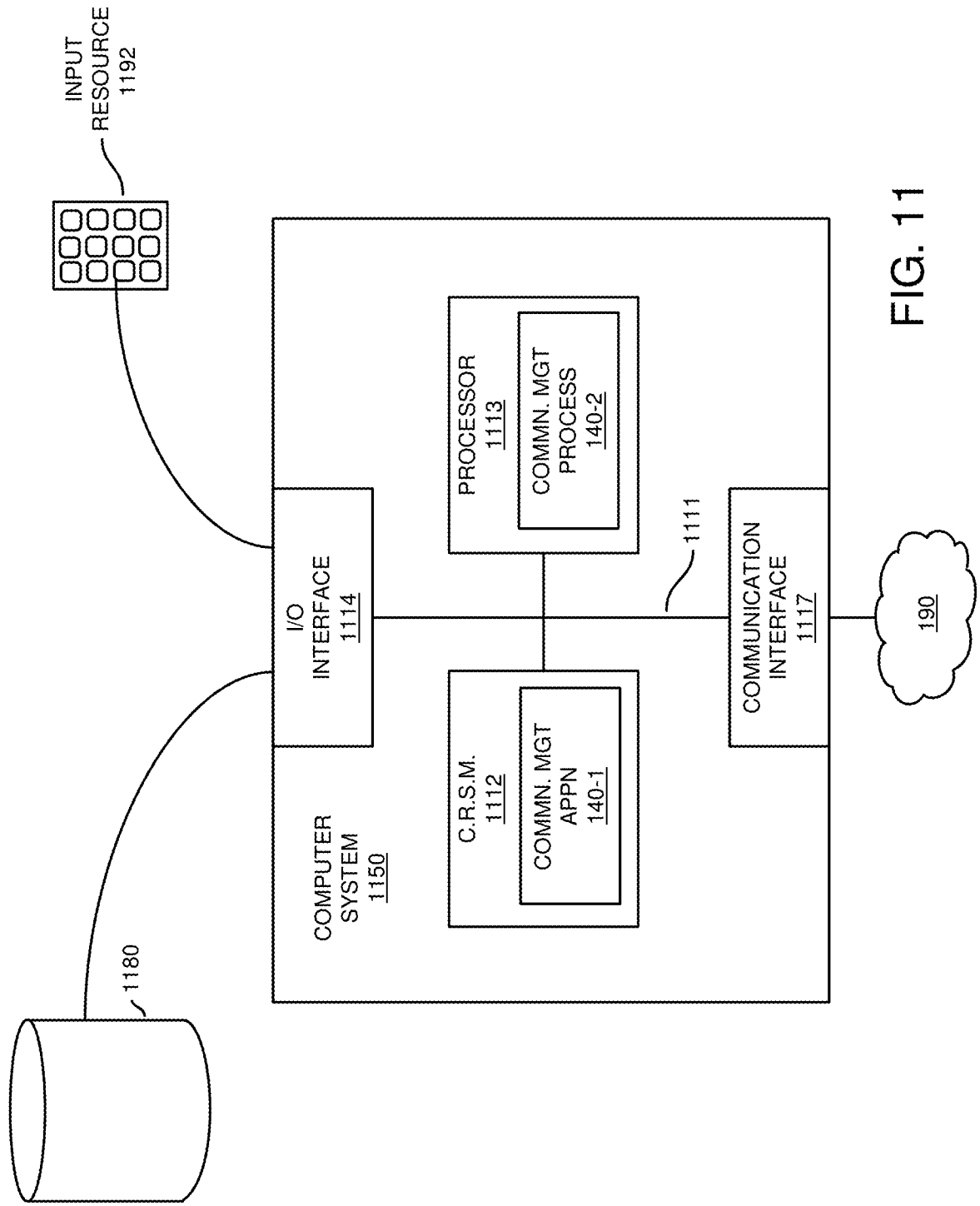
FIG. 11 is an example diagram illustrating example computer hardware and software operable to execute operations according to embodiments herein.

FIG. 11 is an example block diagram of a computer system for implementing any of the operations as previously discussed according to embodiments herein.

Note that any of the resources (such as mobile communication devices, user equipment, wireless stations, wireless base stations, communication management resource, communication management hardware, control management resource, etc.) as discussed herein can be configured to include computer processor hardware and/or corresponding executable instructions (such as software) to carry out the different operations as discussed herein.

For example, as shown, computer system 1150 of the present example includes interconnect 1111 coupling computer readable storage media 1112 such as a non-transitory type of media (which can be any suitable type of hardware storage medium in which digital information can be stored and or retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with communication management application 140-1 (e.g., including instructions) in a respective wireless station to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

Figure 12:
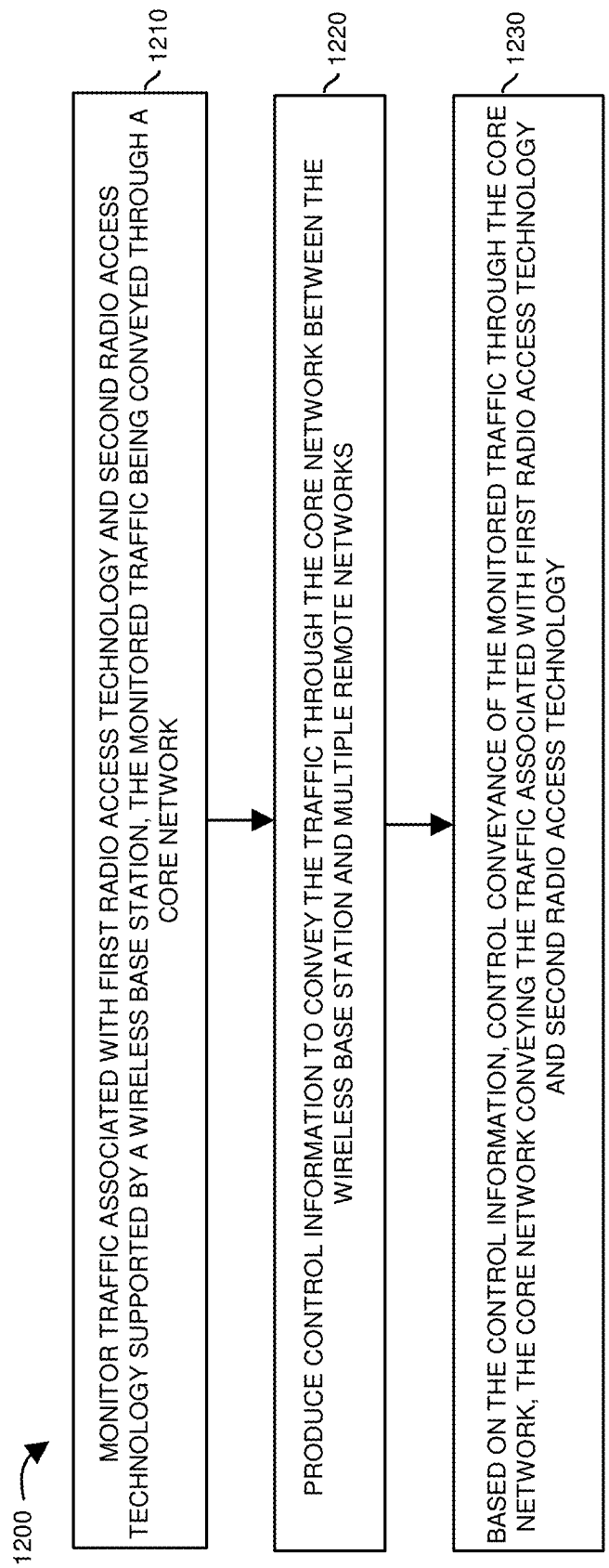
FIG. 12 is an example diagram illustrating a method according to embodiments herein.

FIG. 12 is a flowchart 1200 illustrating an example method according to embodiments herein. Note that there will be some overlap with respect to concepts as discussed above.

In processing operation 1210, the communication management hardware 140 (or network traffic manager 310) monitors traffic such as data packet communications associated with first radio access technology and second radio access technology supported by wireless base station 171. The monitored traffic is presented for delivery through a core network 150.

In processing operation 1220, the communication management hardware 140 produces control information 360 to convey the traffic through the core network 150 between the wireless base station 171 and multiple remote networks 191 and 192.

In processing operation 1230, based on the control information 360, the communication management hardware 140 controls conveyance of the monitored traffic through the core network 150. For example, in accordance with the paths specified by the control information 360, the core network 150 and corresponding switches convey the traffic (a.k.a., communications) associated with first radio access technology and second radio access technology.

Note again that techniques herein are well suited to facilitate distribution of wireless-based data traffic through a core network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   monitoring traffic associated with first radio access technology and second radio access technology supported by a wireless base station, the monitored traffic being conveyed through a core network;
   producing control information to convey the traffic through the core network between the wireless base station and multiple remote networks; and
   based on the control information, controlling conveyance of the monitored traffic over multiple allocated communication paths extending through the core network, the core network conveying first traffic associated with the first radio access technology over a first allocated path of the core network and second traffic associated with the second radio access technology over a second allocated path of the core network.

2. The method as in claim 1, wherein the multiple remote networks include a first remote network and a second remote network with respect to the wireless base station, the first remote network supporting communications associated with the first radio access technology, the second remote network supporting communications associated with the second radio access technology.

3. The method as in claim 2, wherein monitoring traffic associated with first radio access technology and second radio access technology includes:
   receiving first communications from a first base-band unit of the wireless base station supporting the first radio access technology, the first communications being communicated to the first remote network; and
   receiving second communications from a second base-band unit of the wireless base station supporting the second radio access technology, the second communications being communicated to the second remote network.

4. The method as in claim 1, wherein the control information includes first control information and second control information; and
   wherein controlling conveyance of the monitored traffic between the wireless base station and the multiple remote networks includes:
   implementing the first control information to control conveyance of the first communications from a first base-band unit of the wireless base station and the first remote network; and
   implementing the second control information to control conveyance of the second communications from a second base-band unit of the wireless base station and the second remote network.

5. The method as in claim 4, wherein the first control information defines a first communication routing path through the core network from the first base-band unit and the first remote network; and
   wherein the second control information defines a second communication routing path through the core network from the second base-band unit and the second remote network.

6. The method as in claim 1, wherein each of multiple router resources in the core network is dynamically assignable to support conveyance of communications associated with the first radio access technology and the second radio access technology between the wireless base station and the multiple remote networks.

7. The method as in claim 1, wherein the first radio access technology is UMTS (Universal Mobile Telecom System) and the second radio access technology is LTE (long Term Evolution).

8. The method as in claim 1 further comprising:
   receiving a first communication to convey through the core network;
   retrieving a port number from the first communication; and
   based on the port number, determining which of the first radio access technology and the second radio access technology to forward the first communication.

9. The method as in claim 1 further comprising:
   during the monitoring, detecting a first communication to convey through the core network;
   determining a quality of service associated with a mobile communication device to which the first communication pertains; and
   based on the determined quality of service, selecting a routing path through the core network, the selected routing path providing the determined quality of service.

10. The method as in claim 1, wherein the wireless base station supports wireless connectivity with a first mobile communication device and a second mobile communication device, the first mobile communication device communicating first communications in accordance with the first radio access technology, the second mobile communication device communicating second communications in accordance with the second radio access technology; and wherein controlling conveyance of the monitored traffic through the core network includes: adjusting allocation of routing resources in the core network depending on the first communications and the second communications.

11. The method as in claim 1 further comprising:
adjusting allocation of routing resources in the core network depending on wireless bandwidth allocated to support wireless communications between the wireless base station and multiple mobile communication devices.

12. The method as in claim 1, wherein the core network is a packet-switched network.

13. The method as in claim 1, wherein the first allocated path is a first pathway defined by a first set of switch nodes of the core network between the wireless base station and a first remote network, the first remote network supporting conveyance of data packets associated with the first radio access technology; and wherein the second allocated path is a second pathway defined by a second set of switch nodes of the core network between the wireless base station and a second remote network, the second remote network supporting conveyance of data packets associated with the second radio access technology.

14. The method as in claim 1, wherein the first allocated path as specified by the control information indicates a first pathway through a first set of switch nodes in the core network, the first set of switch nodes allocated to convey first communications between the wireless base station and a first remote network supporting the first radio access technology; and wherein the second allocated path as specified by the control information indicates a second pathway through a second set of switch nodes in the core network, the second set of switch nodes allocated to convey second communications between the wireless base station and a second remote network supporting the second radio access technology.

15. The method as in claim 14 further comprising:
receiving a first communication generated by a first application executed on a mobile communication device in wireless communication with the wireless base station, the first communication including a first port number assigned to the first application; and
utilizing the first port number to route the first communication over the first allocated path from the wireless base station to the first remote network;
receiving a second communication generated by a second application executed on the mobile communication device in wireless communication with the wireless base station, the second communication including a second port number assigned to the second application; and
utilizing the second port number to route the second communication over the second allocated path from the wireless base station to the second remote network.

16. The method as in claim 15 further comprising:
implementing first forwarding tables at the first set of switch nodes to communicate the first communication from the wireless base station to the first remote network; and implementing second forwarding tables at the second set of switch nodes to communicate the second communication from the wireless base station to the first remote network.

17. The method as in claim 1 further comprising:
receiving a first communication from the wireless base station, the first communication originating from a first mobile communication device in wireless communication with the wireless base station, the first communication including a first port number of the first mobile communication device;
utilizing the first port number to route the first communication over the first allocated path from the wireless base station to a first remote network supporting the first radio access technology;
receiving a second communication from the wireless base station, the second communication originating from a second mobile communication device in wireless communication with the wireless base station, the second communication including a second port number of the second mobile communication device; and
utilizing the second port number to route the second communication over the second allocated path from the wireless base station to a second remote network supporting the second radio access technology.

18. The method as in claim 1 further comprising:
conveying a first communication over the core network between the wireless base station and a first remote network supporting the first radio access technology based on a first port number in a first received communication, the first port number indicating a first application executing on a mobile communication device in communication with the wireless base station; and
conveying a second communication over the core network between the wireless base station and a second remote network supporting the second radio access technology based on a second port number in a second received communication, the second port number indicating a second application executing on the mobile communication device in communication with the wireless base station.

19. The method as in claim 1, wherein the first allocated path extends between a first edge node and a second edge node of the core network; and
wherein the second allocated path extends between a third edge node and a fourth edge node of the core network.

20. The method as in claim 1 further comprising:
receiving a first communication from a first remote network supporting the first radio access technology, the first communication destined for delivery from the first remote network to a first mobile communication device in wireless communication with the wireless base station, the first communication including a first port number of a first application executed on the first mobile communication device;
utilizing the first port number to route the first communication over the first allocated path from the first remote network to the wireless base station, the wireless base station communicating the first communication to the first application of the first mobile communication device;
receiving a second communication from a second remote network supporting the second radio access technology, the second communication destined for delivery from the second remote network to a second mobile communication device in wireless communication with the wireless base station, the second communication including a second port number of a second application executed on the second mobile communication device; and utilizing the second port number to route the second communication over the second allocated path from the second remote network to the wireless base station, the wireless base station communicating the second communication to the second application of the second mobile communication device.

21. The method as in claim 1 further comprising:

conveying a first communication over the first allocated path of the core network between a first remote network supporting the first radio access technology and the wireless base station based on a first port number in the first communication, the first port number specifying a first port of a mobile communication device in communication with the wireless base station; and conveying a second communication over the second allocated path of the core network between a second remote network supporting the second radio access technology and the wireless base station based on a second port number in the second communication, the second port number specifying a second port of the mobile communication device in communication with the wireless base station.

22. A system comprising:

communication management hardware operative to:

monitor traffic associated with first radio access technology and second radio access technology supported by a wireless base station, the monitored traffic being conveyed through a core network;

produce control information to convey the traffic through the core network between the wireless base station and multiple remote networks; and based on the control information, control conveyance of the monitored traffic over multiple allocated communication paths extending through the core network, the core network conveying the traffic associated with the first radio access technology on a first allocated path of the core network and the second radio access technology on a second allocated path of the core network.

23. The system as in claim 22, wherein the multiple remote networks include a first remote network and a second remote network with respect to the wireless base station, the first remote network supporting communications associated with the first radio access technology, the second remote network supporting communications associated with the second radio access technology.

24. The system as in claim 23, wherein the communication management hardware is further operative to:

receive first communications from a first base-band unit supporting the first radio access technology, the first communications being communicated to the first remote network; and receive second communications from a second base-band unit supporting the second radio access technology, the second communications being communicated to the second remote network.

25. The system as in claim 22, wherein the control information includes first control information and second control information; and wherein the communication management hardware is further operative to:

implement the first control information to control conveyance of the first communications from a first base-band unit of the wireless base station and the first remote network; and implement the second control information to control conveyance of the second communications from a second base-band unit of the wireless base station and the second remote network.

26. The system as in claim 25, wherein the first control information defines a first communication routing path through the core network from the first base-band unit and the first remote network; and wherein the second control information defines a second communication routing path through the core network from the second base-band unit and the second remote network.

27. The system as in claim 22, wherein each of the router resources in the core network is dynamically assignable to support conveyance of communications associated with the first radio access technology and the second radio access technology between the wireless base station and the multiple remote networks.

28. The system as in claim 22, wherein the first radio access technology is UMTS (Universal Mobile Telecom System) and the second radio access technology is LTE (long Term Evolution).

29. The system as in claim 22, wherein the communication management hardware is further operative to:

receive a first communication to convey through the core network;

retrieve a port number from the first communication; and based on the port number, determine which of the first radio access technology and the second radio access technology to forward the first communication.

30. The system as in claim 22, wherein the communication management hardware is further operative to:

during the monitoring, detect a first communication to convey through the core network;

determine a quality of service associated with a mobile communication device to which the first communication pertains; and based on the determined quality of service, select a routing path through the core network, the selected routing path providing the determined quality of service.

31. The system as in claim 22, wherein the wireless base station supports wireless connectivity with a first mobile communication device and a second mobile communication device, the first mobile communication device communicating first communications in accordance with the first radio access technology, the second mobile communication device communicating second communications in accordance with the second radio access technology; and wherein the communication management hardware is further operative to: adjust allocation of routing resources in the core network depending on the first communications and the second communications.

32. Computer-readable storage hardware having instructions stored thereon, the instructions, when carried out by computer processor hardware, cause the computer processor hardware to:

monitor traffic associated with first radio access technology and second radio access technology supported by a wireless base station, the monitored traffic being conveyed through a core network;

produce control information to convey the traffic through the core network between the wireless base station and multiple remote networks; and based on the control information, control conveyance of the monitored traffic through the core network, the core network conveying the traffic associated with first radio access technology and second radio access technology.

\* \* \* \* \*